US008413114B1

(12) United States Patent
Joyce et al.

(10) Patent No.: US 8,413,114 B1
(45) Date of Patent: Apr. 2, 2013

(54) METHOD TO SIMPLIFY DEVELOPING SOFTWARE HAVING LOCALIZATION

(75) Inventors: Scott Joyce, Foxboro, MA (US); Thiago DaSilva, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1208 days.

(21) Appl. No.: 12/238,926

(22) Filed: Sep. 26, 2008

(51) Int. Cl.
G06F 9/44 (2006.01)
(52) U.S. Cl. ........................................ 717/120
(58) Field of Classification Search .................. 717/120
See application file for complete search history.

(56) References Cited

U.S. PATENT DOCUMENTS

| 5,608,860 | A | 3/1997 | Fitzpatrick et al. |
| 5,701,137 | A | 12/1997 | Kiernan et al. |
| 5,742,286 | A | 4/1998 | Kung et al. |
| 5,754,179 | A | 5/1998 | Hocker et al. |
| 5,774,120 | A | 6/1998 | Goddard et al. |
| 5,848,272 | A | 12/1998 | Breggin et al. |
| 5,848,424 | A | 12/1998 | Scheinkman et al. |
| 6,393,429 | B1 | 5/2002 | Yagi et al. |
| 6,944,829 | B2 | 9/2005 | Dando |
| 6,966,033 | B1 | 11/2005 | Gasser et al. |
| 7,007,033 | B1 | 2/2006 | Rothschiller et al. |
| 7,019,743 | B1 | 3/2006 | Wainwright et al. |
| 7,120,646 | B2 | 10/2006 | Streepy, Jr. |
| 7,254,385 | B2 * | 8/2007 | Atkin et al. ................. 455/414.1 |
| 7,281,217 | B2 | 10/2007 | Choudhary et al. |
| 7,293,237 | B1 | 11/2007 | Knight et al. |
| 7,315,985 | B1 | 1/2008 | Gauvin et al. |
| 7,437,676 | B1 | 10/2008 | Magdum et al. |
| 7,532,340 | B2 | 5/2009 | Koppich et al. |

| 2002/0003548 | A1 | 1/2002 | Krusche et al. |
| 2002/0196271 | A1 | 12/2002 | Windl et al. |
| 2003/0066032 | A1 | 4/2003 | Ramachandran et al. |
| 2003/0110469 | A1 * | 6/2003 | Jackson ........................ 717/113 |
| 2003/0160810 | A1 * | 8/2003 | Talley et al. .................. 345/703 |
| 2003/0160825 | A1 | 8/2003 | Weber |
| 2004/0001094 | A1 | 1/2004 | Unnewehr et al. |
| 2004/0056896 | A1 | 3/2004 | Doblmayr et al. |
| 2004/0150664 | A1 | 8/2004 | Baudisch |
| 2005/0050471 | A1 | 3/2005 | Hallisey et al. |
| 2005/0060653 | A1 | 3/2005 | Fukase et al. |
| 2005/0066287 | A1 | 3/2005 | Tattrie et al. |
| 2005/0246636 | A1 | 11/2005 | Blagsvedt et al. |

(Continued)

OTHER PUBLICATIONS

Scott Joyce, et al, "File-Driven Drag and Drop," U.S. Appl. No. 12/240,076, filed Sep. 29, 2008.
Wikipedia, "Markup language", printout pp. 1-5 from http://web.archive.org/web/20070614094750/http://en.wikipedia.org/wiki/Markup_language, dated Jun. 14, 2007.

(Continued)

Primary Examiner — Wei Zhen
Assistant Examiner — Lanny Ung
(74) Attorney, Agent, or Firm — BainwoodHuang

(57) ABSTRACT

A method is provided for displaying a numeric property value. The method includes (a) reading a file from a tangible computer-readable storage medium, the file containing a set of property display patterns, (b) extracting a particular property display code from the file, the particular property display pattern corresponding to the numeric property value to be displayed, (c) extracting a unit of measure and a reference to a conversion function from the particular property display pattern, (d) calling the referenced conversion function to perform a unit conversion on the numeric property value to convert from an internal unit of measure into an display unit of measure, and (e) displaying the converted numeric property value and the extracted unit of measure to a user. In another embodiment, software is provided for executing this method. Additional methods are provided for developing software.

21 Claims, 6 Drawing Sheets

U.S. PATENT DOCUMENTS

| | | |
|---|---|---|
| 2005/0268217 A1 | 12/2005 | Garrison |
| 2006/0070007 A1 | 3/2006 | Cummins et al. |
| 2006/0212822 A1 | 9/2006 | Facemire et al. |
| 2006/0259870 A1 | 11/2006 | Hewitt et al. |
| 2007/0113194 A1 | 5/2007 | Bales et al. |
| 2008/0109743 A1 | 5/2008 | Gibson et al. |
| 2009/0132944 A1 | 5/2009 | Carr et al. |

OTHER PUBLICATIONS

Wikipedia, "Java (programming language)", printout pp. 1-15 from http://web.archive.org/web/20070208054322/ http://en.wikipedia.org/wiki/Java_%28programming_language%29, dated Feb. 8, 2007.

* cited by examiner

Fig. 2
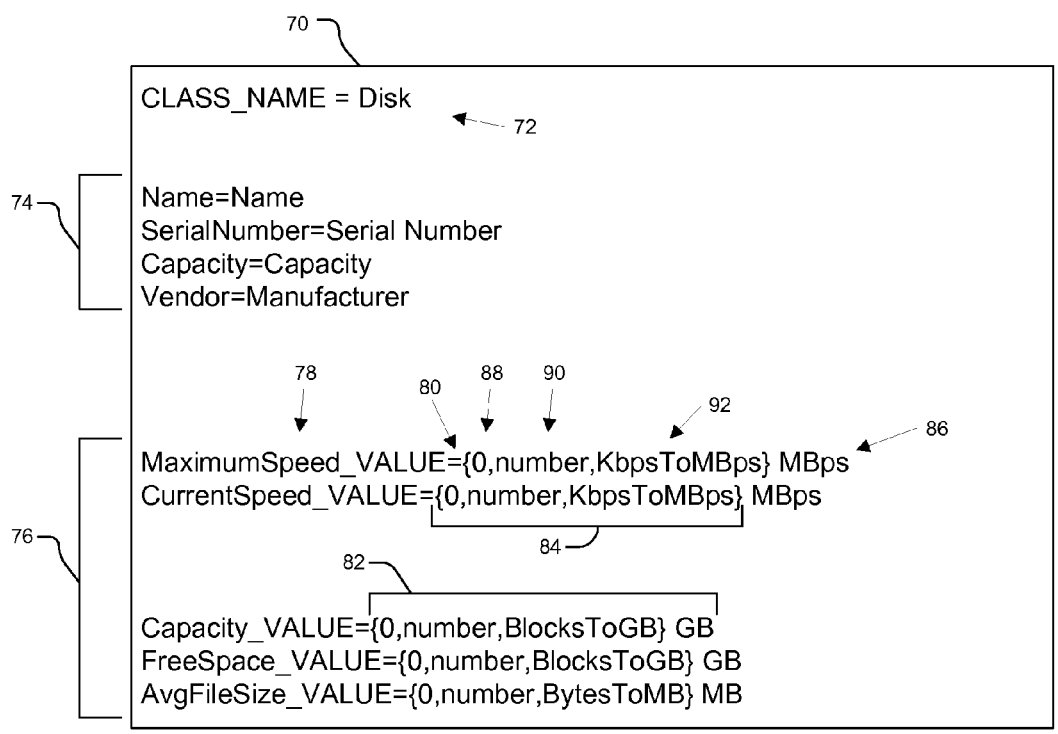
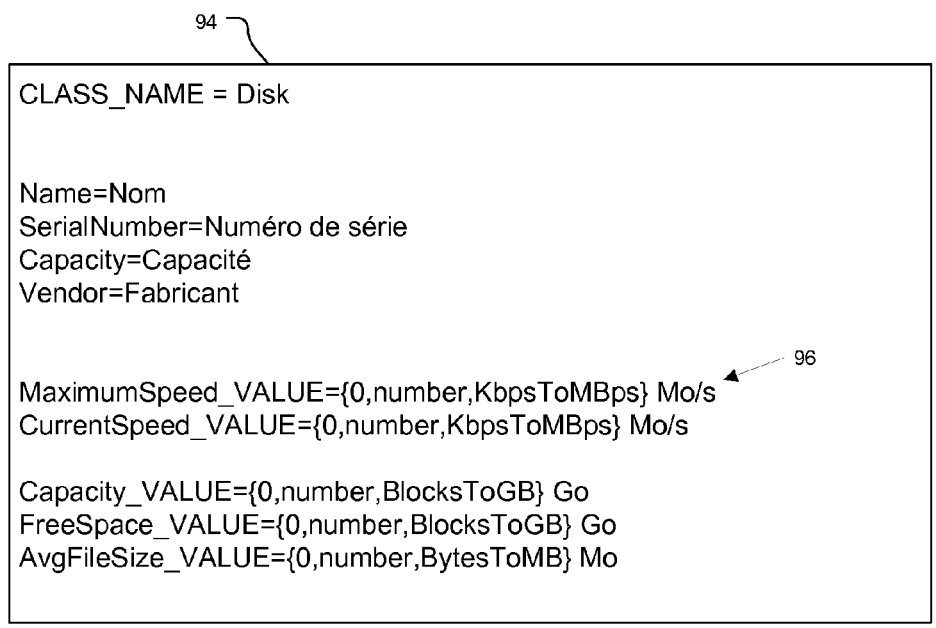

110
Read a file from a tangible computer-readable storage medium, the file containing a set of property display patterns

120
Extract a particular property display code from the file, the particular property display pattern corresponding to the numeric property value to be displayed

130
Extract a unit of measure and a reference to a conversion function from the particular property display pattern

140
Call the referenced conversion function to perform a unit conversion on the numeric property value to convert from an internal unit of measure into an display unit of measure

150
Display the converted numeric property value and the extracted unit of measure to a user

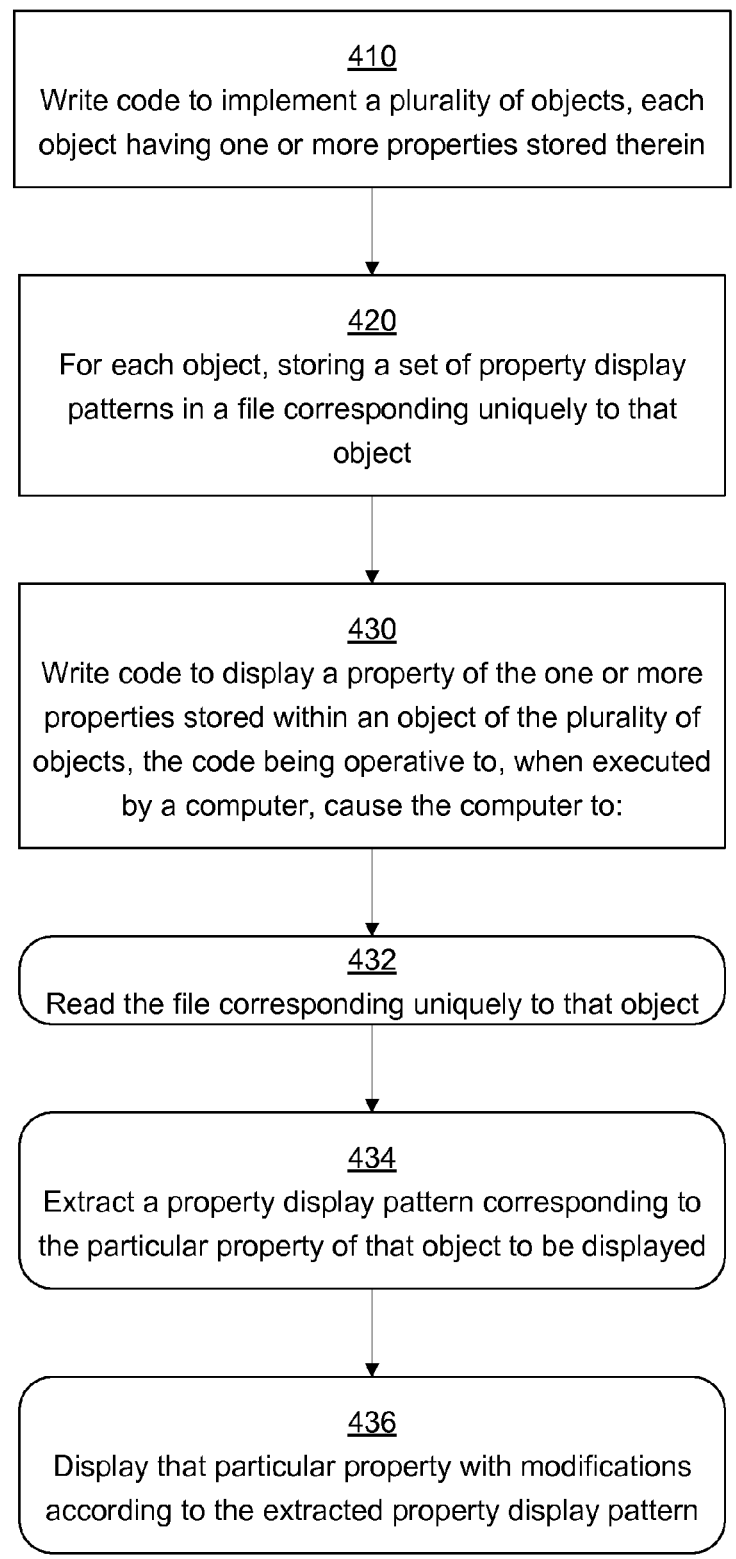

METHOD TO SIMPLIFY DEVELOPING SOFTWARE HAVING LOCALIZATION

BACKGROUND

In a conventional software development process, a localization feature is added to the software by packaging the software with a set of properties files containing patterns which allow the software code to modify display elements according to the locale. In such a conventional system, each dialog box (or other viewing unit) within the software application typically has an associated properties file having property substitutions relevant to that dialog box. The software developer creates each properties file in accordance with the properties needed by that dialog box. Translators typically copy the set of properties files and modify their contents to reflect the local language and customs of a particular locale.

For example, a software application may indicate that a disk stores 3.5 GB (gigabytes) of data. Using Java localization features, an English properties file may include the line:
   Capacity={0} GB
while a French properties file may include the line
   Capacity={0} Go since the French word for gigabyte is "gigaoctet." When using the appropriate java.text and java.util packages, the properties file allows the software to display 3.5 GB while in an English locale, and 3.5 Go in a French locale.

SUMMARY

However, the above-described technique is deficient. In particular, while developing a large software application, a large number of properties files may need to be created, potentially having a significant amount of repetitive information. Furthermore, while the above-described technique allows the language to be changed, the units remain constant. Thus, if in 5 years the typical users of the software instead use disk having capacities on the order of multiple terabytes, in order to prevent users from seeing 83,050 GB or 83,050 Go, the developers will have to re-write large portions of the code to change the units. In contrast, embodiments of the present invention allow a smaller number of properties files to be used with less repetitive information. Embodiments of the present invention also allow developers to modify the units using properties file without making modifications to the code.

In one embodiment, a method is provided for displaying a numeric property value. The method includes (a) reading a file from a tangible computer-readable storage medium, the file containing a set of property display patterns, (b) extracting a particular property display code from the file, the particular property display pattern corresponding to the numeric property value to be displayed, (c) extracting a unit of measure and a reference to a conversion function from the particular property display pattern, (d) calling the referenced conversion function to perform a unit conversion on the numeric property value to convert from an internal unit of measure into an display unit of measure, and (e) displaying the converted numeric property value and the extracted unit of measure to a user. In another embodiment, software is provided for executing this method.

In another embodiment, a method is provided for developing software. The method includes (a) writing code for software having one or more numeric property variables stored therein, (b) storing a set of property display patterns on a tangible computer-readable medium, each property display pattern corresponding to a numeric property variable of the one or more numeric property variables, wherein each property display pattern contains a unit of measure and a reference to a conversion function, and (c) writing code for software to display a numeric property variable of the one or more numeric property variables. The code is operative to, when executed by a computer, cause the computer to (1) read from the set of property display patterns off the tangible computer-readable medium, (2) extract a property display pattern corresponding to the particular numeric property variable, (3) extract the unit of measure and a reference to the conversion function from the extracted property display pattern, (4) generate a converted numeric property value by calling the referenced conversion function to perform a unit conversion on the numeric property variable to convert from an internal unit of measure into an display unit of measure, and (5) display the converted numeric property value and the extracted unit of measure to a user.

In another embodiment, a method is provided for developing software. The method includes (a) writing code to implement a plurality of objects, each object having one or more properties stored therein, (b) for each object, storing a set of property display patterns in a file corresponding uniquely to that object, the file stored on a tangible computer-readable medium, and (c) writing code to display a property of the one or more properties stored within an object of the plurality of objects. The code is operative to, when executed by a computer, cause the computer to (1) read the file corresponding uniquely to that object, (2) extract a property display pattern corresponding to the particular property of that object to be displayed, and (3) display that particular property with modifications according to the extracted property display pattern.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2 illustrates example localized property files for use in practicing various embodiments.

FIG. 3 illustrates a method of one embodiment.

FIG. 6 illustrates a method of another embodiment.

DETAILED DESCRIPTION

Figure 1:
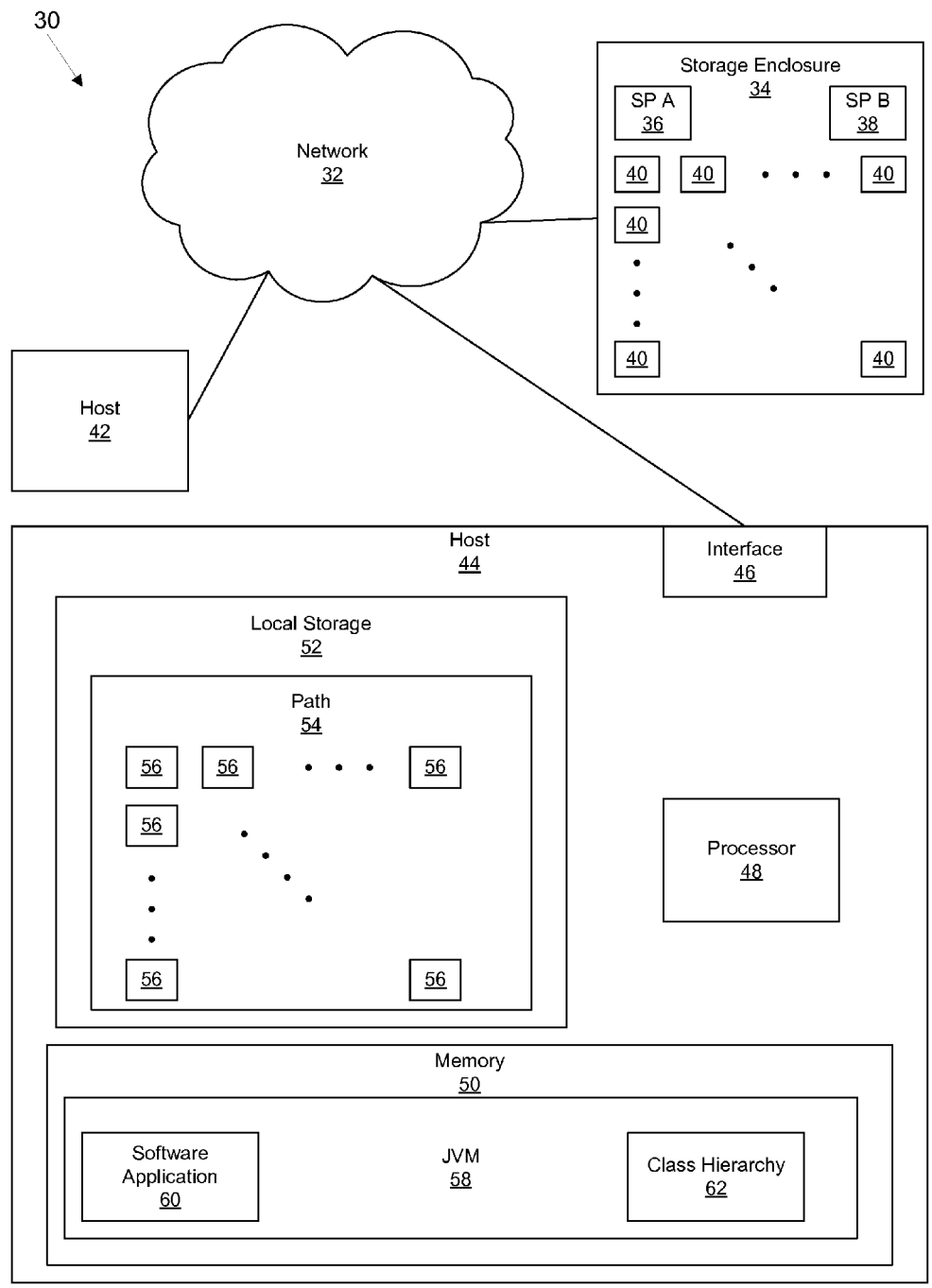
FIG. 1 illustrates an example system for use in practicing various embodiments.

FIG. 1 depicts an example data storage system 30 for use in practicing one embodiment. System 30 includes a network 32. Attached to the network 32 are one more storage enclosures 34. Each storage enclosure contains one or more storage processors 36, 38 and a number of disks 40, for example, 240 disks 40. Network 32 also connects to one or more hosts 42, 44. Looking at host 44 in more detail, host 44 includes an interface 46 for connecting to the network 32, a processor 48 (such as a CPU or multiple CPUs running in parallel), memory 50, and non-volatile local storage 52 (such as, for example, a hard disk or a flash drive). Local storage includes a path 54, within which are located one or more properties files 56. Memory 50 stores a Java Virtual Machine (JVM) 58 running on the processor 48. Running within the JVM 58 is a software application 60, such as a data storage system management application. The JVM may also store a class hierarchy 62 associated with the software application 60.

FIG. 2 depicts two example properties files 56 for use in practicing various embodiments. One is an English locale properties file 70, while the second is a French locale properties file 94. Looking in detail at the English properties file 70, the file includes a class name definition 72 as well as a list of property definitions 74, 76. The first set of property definitions 74 include locale-based substitutions, as is well-known in the art. Thus, while "Name" is used in an English locale, "Nom" is used in a French locale. The second set of property definitions 76 includes unit conversions. Each property definition includes a property name 78, an assignment operator (in this case "=") 80, and a property display pattern 82. Property display pattern 82 may contain a numeric conversion field 84 and a unit of measure name 86. For example, one unit of measure is MBps (megabytes per second), while other units of measure include GB (gigabyte) and MB (megabyte). Numeric conversion field 84 contains an argument index 80 (in this case 0, representing the first argument), a "number" indicator 90 (indicating that the argument is to be interpreted as a number, and a reference to a conversion function 92. In general, the reference to the conversion function 92 will be in the form of a name of a conversion function as used within software application 60 code. For example, the code may define various conversion functions, with name such as, for example, KbpsToMBps (for converting from kilobits per second to megabytes per second), BlocksToGB (for converting from blocks to gigabytes), and ByesToMB (for converting from bytes to megabytes). French properties file 94 is analogous, but various properties are defined in French. In particular, note that unit of measure names 96 are in French rather than English.

FIG. 3 depicts a method 100 for displaying a numeric property value. In step 110, a computer, such as, for example, host 44, reads a file from a tangible computer-readable storage medium. A tangible computer-readable storage medium is a medium which has a tangible physical form and which is readable by a computer, such as, for example, a magnetic disk, an optical disk, or non-volatile flash-based memory. The file, such as a properties file 56, 70, 94 as shown in FIGS. 1-2, contains a set of property display patterns 82.

In step 120, the computer extracts a particular property display pattern 82 from the file, the particular property display pattern 82 corresponding to the numeric property value to be displayed. Thus, for example, if the numeric property value to be displayed is the maximum speed of a disk, the computer will find the line containing property name 78 "MaximumSpeed_VALUE" and extract the property display pattern 82 immediately following the assignment operator 80 on that line (in this case "{0,number,KbpsToMBps} MBps" for the English locale from properties file 70).

In step 130, the computer extracts a unit of measure 86 (in this example "MBps") and a reference to a conversion function (in this example the function name "KbpsToMBps") from the particular property display pattern 82. It should be understood that this may be done in various ways. In one embodiment, property display pattern 82 is interpreted as a pattern to be fed into the java.text.MessageFormat class (or in some embodiments, a similar class with additional functionality) together with an argument array having the numeric property value to be displayed (in whatever format the software application stored that value internally) as the first element. Since the numeric property value is the first value in the array, the java.text.MessageFormat class interprets the "0" in the property display pattern 82 as a reference to that value.

The "number" indicator 90 indicates that the property is numeric and should be displayed with the aid of the java.text.NumberFormat class, and in particular, the java.text.DecimalFormat class. In step 140, the computer calls the referenced conversion function 92 to perform a unit conversion on the numeric property value to convert from an internal unit of measure into an display unit of measure 86. Thus, continuing in the example, if the numeric property value has a value of 2457600 (which is stored internally as an integer to represent kilobits per second), conversion function 92 KbpsToMBps is called to convert 2457600 Kbps to 300 MBps. In one embodiment, instead of using the java.text.DecimalFormat class, a wrapper class is used which displays the numeric property as a decimal, but first uses the reference to the conversion function 92 to make a function call to the referenced conversion function 92. Conversion function 92 converts the value before it is displayed by the java.text.DecimalFormat class. It should be understood that software application 60 code stores several conversion function 92 definitions, allowing flexibility in interpreting numeric property values.

Finally, in step 150, the computer displays the converted numeric property value and the extracted unit of measure to a user, for example, on a computer monitor. Thus, continuing in the example, "300 MBps" would be displayed on the screen. If the French properties file 94 were used instead, "300 Mo/s" would be displayed instead.

In another embodiment, method 100 is implemented in software, the software being stored on a tangible computer-readable medium. In one embodiment, the software is written in Java. When executed by a computer, the software causes method 100 to be performed.

Figure 4:
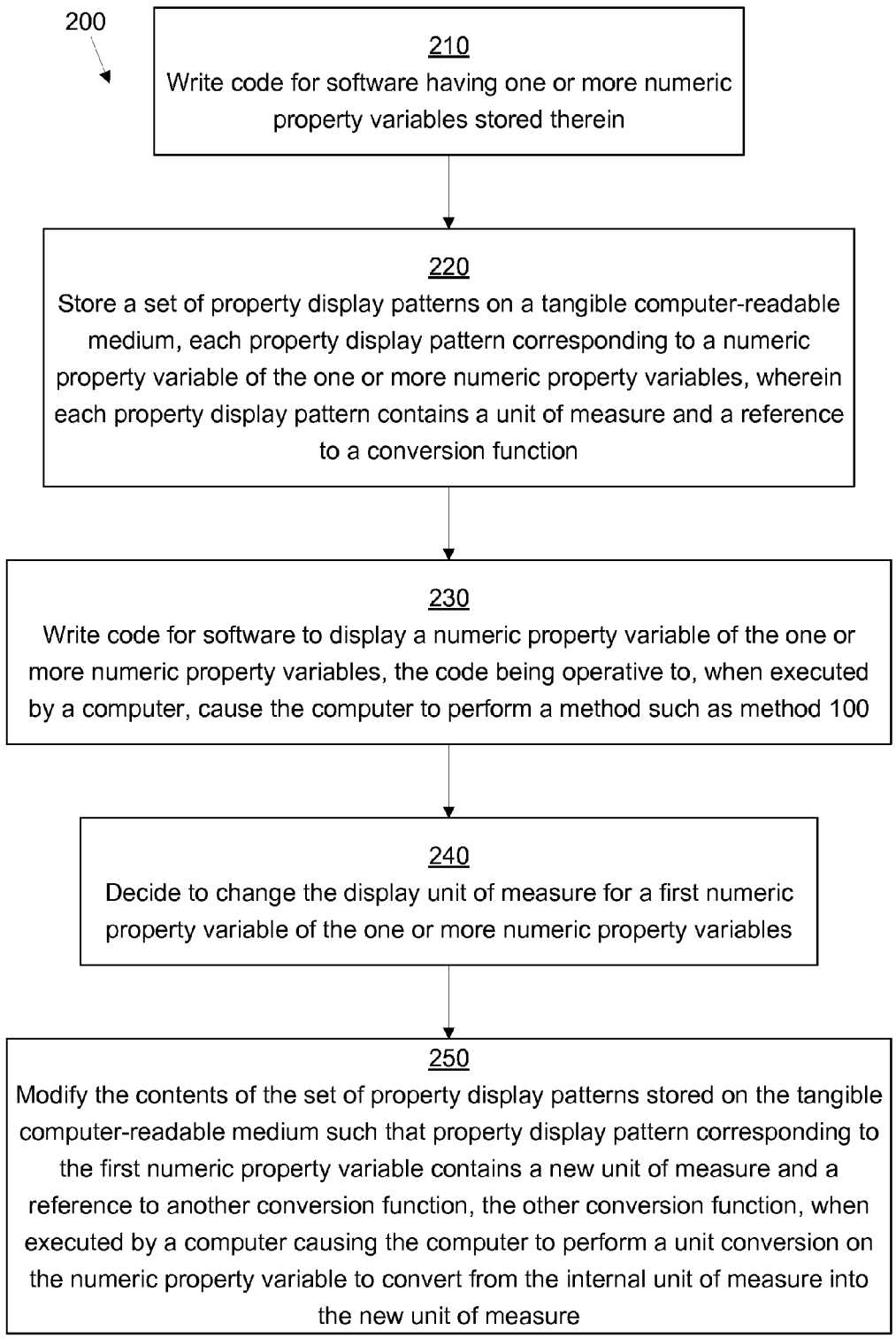
FIG. 4 illustrates a method of another embodiment.

FIG. 4 depicts a method 200 for developing software. In step 210, a software developer writes software code, for example in Java. The code includes one or more numeric property variables.

In step 220, the developer (or an agent or assistant of the developer) stores a set of property display patterns 82 on a tangible computer-readable medium, each property display pattern 82 corresponding to a numeric property variable of the one or more numeric property variables. Each property display pattern 82 contains a unit of measure name 86 and a reference to a conversion function 92. This allows the developer to hide the details of the conversion from the code to reduce the complexity. The property display patterns 82 may be stored on the tangible computer-readable medium in a single file or they may be spread out across multiple files. Further detail with respect to which files are used is provided below.

In step 230, the developer writes code for software to display a numeric property variable of the one or more numeric property variables, the code being operative to, when executed by a computer, cause the computer to perform a method such as method 100. Thus, the software is able to display the numeric property variables according to the property display patterns 82 stored in the file.

In optional step 240, at a later point in time, the developer may decide to change the display unit of measure for a first numeric property variable of the one or more numeric property variables. In a conventional arrangement, the developer would have to rewrite a large portion of the code to reference new conversion functions. However, in this embodiment, the developer may not need to change any code at all if a proper conversion function already exists within the code. Thus, in optional step 250, the developer modifies the contents of the set of property display patterns 82 stored on the tangible computer-readable medium such that property display pattern 82 corresponding to the first numeric property variable contains a new unit of measure 86 and a reference to another conversion function 92, the other conversion function 92, when executed by a computer causing the computer to perform a unit conversion on the numeric property variable to convert from the internal unit of measure into the new unit of measure. Thus, going back to the example from method 100, if the developer wishes to change the display unit for the maximum speed of a disk from MBps to GBps (for example, if after several years the typical speed of a disk increases by a factor of 10 or more), then the developer may modify the properties file 70 so that the display unit name 86 on the MaximumSpeed_VALUE line is "GBps" instead of "MBps" and also modifies the reference to the conversion function 92 to be "KbpsToGBps" instead of "KbpsToMBps." If the KbpsToGBps function already exists within the code, then no modification to the code is needed. However, if that function does not already exist within the code, some modification to the code will be required, however, if the units of multiple properties are being changed, less modification to the code will be needed per change.

Figure 5:
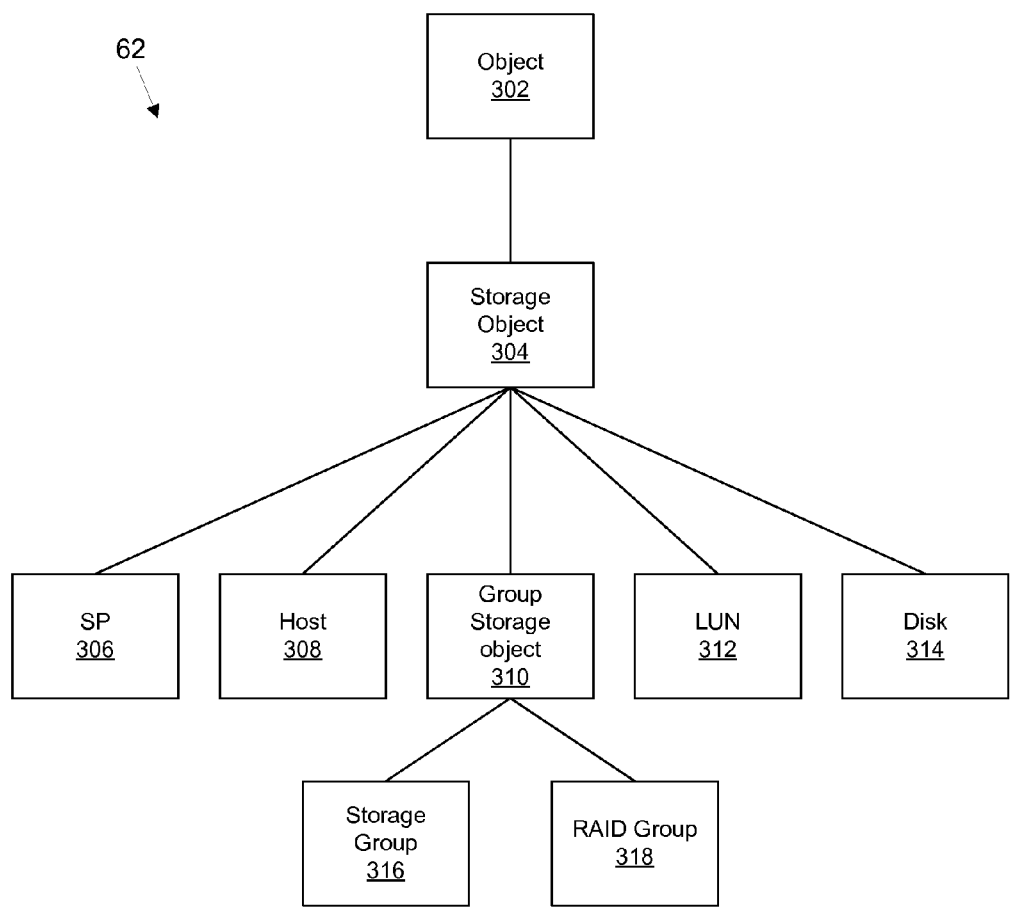
FIG. 5 illustrates an example object hierarchy for use in practicing one embodiment.

FIG. 5 depicts an example class hierarchy 62 of one embodiment. Most Java classes inherently inherit from the Java object class, so the object class 302 sits atop the hierarchy. If software application 60 is a data storage management application, it may contain a storage object class 304 which inherits from the object class. Several classes then inherit from the storage object class 304, such as, for example, the SP (storage processor) class 306, host class 308, group storage object class 310, LUN class 312, and disk class 314. Storage group class 316 and RAID group class 318, for example, further inherit from group storage object class 310.

Because various properties may be shared between the various classes, it is desirable to avoid storing repetitive property definitions many times.

FIG. 6 depicts a method 400 of developing software of one embodiment to solve this problem. In step 410, a software developer writes software code, for example in Java. The code includes several objects, each object having one or more properties.

In step 420, the developer (or an agent or assistant of the developer) stores, for each object, a set of property display patterns 82 in a file corresponding uniquely to that object. This allows properties to be stored on an object-by-object basis instead of in a dialog-by-dialog basis. Since there are typically many dialog boxes associated with each object, this reduces the number of properties files needed.

In step 430, the developer writes code for software to display a property of the one or more properties stored within an object of the plurality of objects, the code being operative to, when executed by a computer, cause the computer to perform a method having the following 3 steps:

In step 432, the computer reads the file corresponding uniquely to that object.

In step 434, the computer extracts a property display pattern 82 corresponding to the particular property of that object to be displayed.

In step 436, the computer displays that particular property with modifications according to the extracted property display pattern 82. In addition, every properties file 56 for each object may inherit property definitions from property files of objects within the object's class hierarchy. Thus, for example, the property definition "Name=Name" may appear in the properties file associated with the storage object class 304, alleviating the need for that property definition to be placed in each class which inherits from storage object class 304. This is because in step 434, after reading the properties file for the object at issue, if a property display pattern 82 for the particular property of that object to be displayed is not found in the file, the computer may then proceed to read the properties file 56 of the base class of that object in order to find the appropriate property display pattern 82. If it is not found in that file either, the computer continues to traverse up the object hierarchy 82 until it finds the property display pattern 82 it is looking for. Thus, if the application needs to know the value of the Name property within the storage group class 316, it will first search the properties file 56 for that class. If the Name property is not defined in that file, it will next examine the properties file 56 for the group storage object class 310. If the Name property is not defined in that file, it will next examine the properties file 56 for the storage object class 304. Since the Name property is defined in the properties file 56 for the storage object class 304, the traversal will stop there, and the Name property will be determined to have value "Name."

While various embodiments of the invention have been particularly shown and described, it will be understood by those skilled in the art that various changes in form and details may be made therein without departing from the spirit and scope of the invention as defined by the appended claims.

For example, although various embodiments have been described in the data storage system context, the present invention is not limited to that context. Thus, unit conversions may occur between any kinds of units, such as, for example, between feet and meters in a CAD software application running on a personal computer. The class hierarchy 82 may also represent objects in a different context, for example, such as account types in a piece of accounting software running on a mainframe computer.

Furthermore, it should be understood that all embodiments which have been described may be combined in all possible combinations with each other, except to the extent that such combinations have been explicitly excluded.

What is claimed is:

1. A method for displaying a numeric property value, the method comprising:

reading a file from a tangible computer-readable storage medium, the file containing a set of property display patterns;

extracting a particular property display pattern from the file, the particular property display pattern corresponding to the numeric property value to be displayed;

extracting a unit of measure and a reference to a conversion function from the particular property display pattern;

calling the referenced conversion function to perform a unit conversion on the numeric property value to convert from an internal unit of measure into a display unit of measure; and displaying the converted numeric property value and the extracted unit of measure to a user.

2. A method as in claim 1 wherein reading the file includes choosing a particular file to read, the particular file corresponding to a particular locale.

3. A method as in claim 1 wherein:

the numeric property value is a member of a class; and reading the file includes choosing a particular file to read, the particular file corresponding uniquely to the class.

4. A method as in claim 1 wherein:

the numeric property value is a member of a first class of a plurality of classes, the first class inheriting from a base class according to a class hierarchy; and the method further includes choosing the file to read from a plurality of files, each file being uniquely associated with a class of the plurality of classes, wherein choosing the file to read from the plurality of files includes:

choosing a file uniquely associated with the first class if that file stores a property display pattern corresponding to the numeric property value to be displayed; otherwise choosing a file corresponding to the base class if that file stores a property display pattern corresponding to the numeric property value to be displayed; otherwise choosing a file corresponding to another class of the class hierarchy if that file stores a property display pattern corresponding to the numeric property value to be displayed.

5. A method as in claim 1 wherein extracting the particular property display pattern from the file includes:

searching the file for a property name corresponding to the numeric property value followed by an assignment operator; and extracting, from the file, a string following the assignment operator, the string representing the particular property display pattern.

6. A method as in claim 1 wherein the internal unit of measure is a unit of measure in which the numeric property value is internally stored, and the display unit of measure is the extracted unit of measure.

7. Computer software stored on a tangible non-transitory computer-readable medium, which when executed by a computer causes the computer to perform a method as in claim 1.

8. Computer software stored on a tangible non-transitory computer-readable medium, which when executed by a computer causes the computer to perform a method as in claim 2.

9. Computer software stored on a tangible non-transitory computer-readable medium, which when executed by a computer causes the computer to perform a method as in claim 3.

10. Computer software stored on a tangible non-transitory computer-readable medium, which when executed by a computer causes the computer to perform a method as in claim 4.

11. Computer software stored on a tangible non-transitory computer-readable medium, which when executed by a computer causes the computer to perform a method as in claim 5.

12. Computer software stored on a tangible non-transitory computer-readable medium, which when executed by a computer causes the computer to perform a method as in claim 6.

13. A method for developing software, the method comprising:

writing code for software having one or more numeric property variables stored therein;

storing a set of property display patterns on a tangible computer-readable medium, each property display pattern corresponding to a numeric property variable of the one or more numeric property variables, wherein each property display pattern contains a unit of measure and a reference to a conversion function; and writing code for software to display a numeric property variable of the one or more numeric property variables, the code being operative to, when executed by a computer, cause the computer to:

read from the set of property display patterns off the tangible computer-readable medium;

extract a property display pattern corresponding to the particular numeric property variable;

extract the unit of measure and a reference to the conversion function from the extracted property display pattern;

generate a converted numeric property value by calling the referenced conversion function to perform a unit conversion on the numeric property variable to convert from an internal unit of measure into a display unit of measure; and display the converted numeric property value and the extracted unit of measure to a user.

14. A method as in claim 13 wherein the method further comprises at a later time:

deciding to change the display unit of measure for a first numeric property variable of the one or more numeric property variables; and modifying the contents of the set of property display patterns stored on the tangible computer-readable medium such that property display pattern corresponding to the first numeric property variable contains a new unit of measure and a reference to another conversion function, the other conversion function, when executed by a computer causing the computer to perform a unit conversion on the numeric property variable to convert from the internal unit of measure into the new unit of measure.

15. A method as in claim 13 wherein:

the set of set of property display patterns is stored within a first file on the tangible computer-readable medium;

storing a corresponding set of property display patterns in a second file on the tangible computer-readable medium, the corresponding set of property display patterns implementing a different locale; and the code is further operative to, when executed by a computer, cause the computer to choose a particular file to read, the particular file corresponding to a particular locale.

16. A method as in claim 13 wherein:

each numeric property variable is a member of one class of a set of classes;

storing the set of property display patterns on a tangible computer-readable medium includes storing each property display pattern of the set of property display patterns in a file, stored on the tangible computer-readable medium, uniquely corresponding to the particular class that the numeric property variable that that property display pattern corresponds to is a member of; and the code is further operative to, when executed by a computer, cause the computer to choose a particular file to read, the particular file corresponding to the particular class that the numeric property variable that that property display pattern corresponds to is a member of.

17. A method as in claim 13 wherein:

each numeric property variable is a member of one class of a set of classes, at least one class inheriting from a base class, the base class also within the set of classes, according to a class hierarchy;

storing the set of property display patterns on a tangible computer-readable medium includes storing each property display pattern of the set of property display patterns in a file, stored on the tangible computer-readable medium, uniquely corresponding to the particular class that the numeric property variable that that property display pattern corresponds to is a member of; and the code is further operative to, when executed by a computer, cause the computer to choose a particular file to read, wherein choosing the particular file to read includes:

choosing a file uniquely associated with the particular class that the numeric property variable that that property display pattern corresponds to is a member of, if that file stores a property display pattern corresponding to the numeric property value to be displayed; otherwise choosing a file corresponding to a base class of that particular class if that file stores a property display pattern corresponding to the numeric property value to be displayed; otherwise choosing a file corresponding to another class of the class hierarchy of that particular class if that file stores a property display pattern corresponding to the numeric property value to be displayed.

18. A method as in claim 13 wherein:

storing the set of property display patterns on a tangible computer-readable medium includes, for each numeric property variable, storing, in a file stored on the tangible computer-readable medium, a property name corresponding to that numeric property variable followed by an assignment operator followed by a string representing the particular property display pattern; and the code, when executed by the computer to extract the particular property display pattern, is operative to cause the computer to:

search a file for the property name corresponding to that numeric property variable followed by the assignment operator; and extract, from the file, the string representing the particular property display pattern.

19. A method as in claim 13 wherein the internal unit of measure is a unit of measure in which the software internally stores the numeric property value, and the display unit of measure is the extracted unit of measure.

20. A method as in claim 1 wherein the set of property display patterns includes:

a first property display pattern corresponding to a first numeric property value, the first property display pattern including a first reference to a specific conversion function; and a second property display pattern corresponding to a second numeric property value, the first numeric property value being distinct from the second numeric property value, the second property display pattern including a second reference to the specific conversion function.

21. A method as in claim 13 wherein:

the reference to the conversion function includes a name of a conversion function defined within the code for software to display the numeric property variable; and extracting the reference to the conversion function from the extracted property display pattern includes interpreting the extracted property display pattern as a sequence of tabular fields and extracting the name of the conversion function from a particular tabular fields of the sequence of tabular fields.

\* \* \* \* \*